Figure 1:
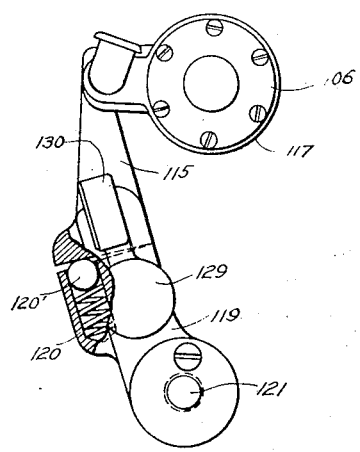

July 4, 1939.  F. J. LOOMIS ET AL  2,164,748

SOUND HEAD

Original Filed Oct. 14, 1932

INVENTORS.
FRED J. LOOMIS
BY ELWOOD W. REYNOLDS
ATTORNEY.

Patented July 4, 1939

2,164,748

UNITED STATES PATENT OFFICE 2,164,748

SOUND HEAD

Fred J. Loomis, Rochester, N. Y., and Ellwood W. Reynolds, Westfield, N. J., assignors to Radio Corporation of America, a corporation of Delaware Original applications October 14, 1932, Serial No. 637,852, and June 26, 1935, Serial No. 28,444. Divided and this application May 13, 1937, Serial No. 142,394

4 Claims. (Cl. 271—2.3)

This invention relates to structure adapted for use in soundheads such as those adapted to be used in combination with motion picture apparatus for the purpose of producing talking motion pictures, and is a division of our applications No. 637,852 filed October 14, 1932, now Patent No. 2,019,147, issued October 29, 1935, and No. 28,444 filed June 26, 1935. It will be apparent, however, that its utility is by no means limited to such use.

It has for many years been customary in the talking picture art to provide a sound reproducing mechanism commonly known as a soundhead which is adapted for attachment to a motion picture projector and which is provided with a drive mechanism common to both the soundhead and the projector so that a single film carrying both the picture and sound records can be run consecutively through the two instrumentalities and sound can be reproduced from the film in exact synchronism with the picture projected from the same film.

The soundhead ordinarily includes an exciter lamp, an optical system and a photoelectric cell, although any other desirable form of sound take-off may be used. The sound record moving mechanism may be mounted inside or exterior to the soundhead. Considerable difficulty has heretofore been encountered in the past due to the necessity for moving the film at an absolutely uniform speed past the sound reproduction point, the production of such uniform movement being rendered difficult because of the necessity of moving the film by means of sprockets cooperating with the sprocket holes therein, and because of irregularities in the operation of the driving mechanism and its attendant gearing.

One object of the invention is the production of a soundhead which is adapted to cooperate with the standard types of motion picture apparatus and which is capable of such an extremely accurate movement of the film that a high degree of fidelity of the reproduced sound is realized.

Another object of the invention is the production of such a soundhead having greatest possible simplicity and lowest production cost.

Another object of the invention is the production of a soundhead which will permit large manufacturing tolerances and at the same time produce a device having an extremely high degree of precision.

Another object of the invention is to provide a roller which will firmly hold the film in contact with the supporting drum at the reproduction point and guide it in a straight line laterally as it passes around the drum.

Another object of the invention is to provide a guide roller which will laterally guide any given standard width of film regardless of the shrinkage thereof.

Another object of the invention is to provide a guide roller whose frictional resistance to the film roller is small and whose variations to the resistance are negligible whereby it affects to the least possible extent the motion of the film drum.

Another object of the invention is to provide an improved pad roller for retaining the film upon the driving sprockets which is held definitely in position but which is easily adjustable.

Another object of the invention is the provision of a pressure roller which will hold the film upon the film drum with a uniform pressure and with a minimum of friction.

Another object of the invention is to provide improved pad rollers and means of adjustment therefor for retaining the film upon the sprockets.

Figure 2:
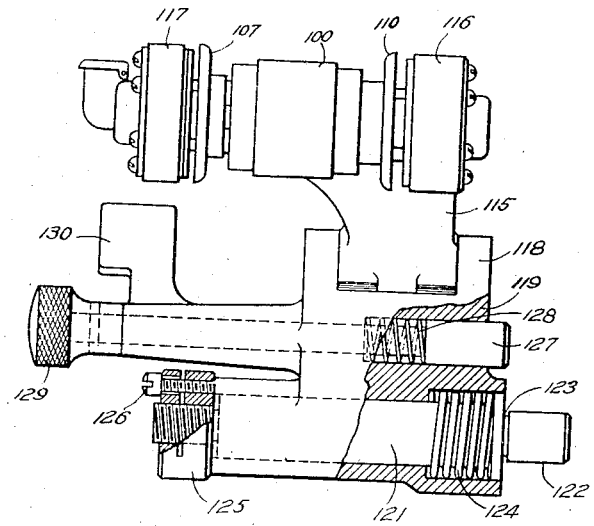
Figure 3:
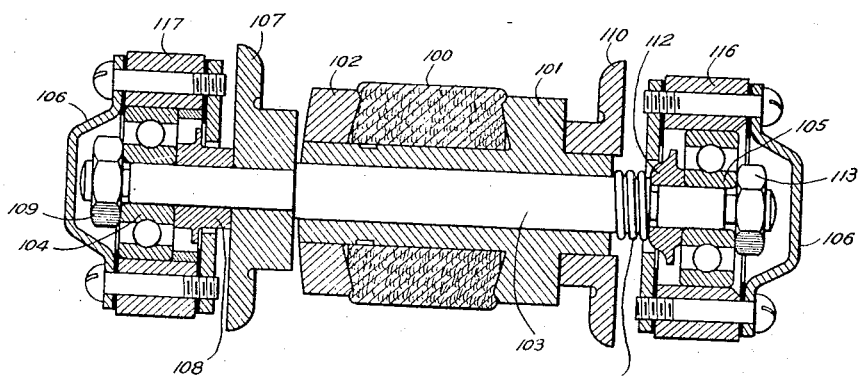

In the drawing:

Figures 1, 2, and 3 show details of the pressure roller which holds the film upon the drum.

It is necessary, in a device of the class described, that the pressure roller shall hold the film firmly against the film drum without slippage; that it rotate so freely as to avoid any interference with the operation of the drum; and that it guide the film laterally to maintain it exactly in position between the optical system and the photocell. This portion of the device is shown in Figs. 1 to 3, inclusive.

The roller surface 100 is formed from a fine grade of felt, and after being placed upon the combined spindle and clamping ring 101 is fastened rigidly thereupon by the member 102 and thereafter ground to an accurate circular form. The member 101 is mounted upon a shaft 103 which extends entirely through the rotating portions of the unit. This shaft is carried in ball-bearings 104 and 105 which are mounted in a bracket hereinafter described and protected by the collar members 106. Mounted firmly upon the shaft and abutting against the collar thereof is the guide member 107 which serves to guide the edge of the film adjacent the soundtrack. The member 107 is separated from the adjacent ball-bearing 104 by the spacer member 108 which, with the assistance of the nut 109, holds the member 107 firmly against the shoulder on the shaft 103.

The member 101 has fitted firmly thereupon a member 110 which corresponds in general appearance and function to member 107, but the entire unit comprising the members 100, 101, 102 and 110 is slidable longitudinally on the shaft 103 and is pressed toward the member 107 by the spring 111. The spring 111 is fixed in position by the collar 112 which fits against the shoulder on the shaft 103 and is held thereagainst by the nut 113 and the inner ring of the ball-bearing 105. The spacing of the members 107 and 110 is so chosen that they will be slightly separated when a film of the minimum usable width is between them, and will of course be separated a greater distance by wider film. Due to the long bearing of the member 101 upon the shaft 103, the members 107 and 110 will always remain in exact parallelism, while the entire unit will rotate freely upon the ball-bearings 103 and 105.

The bearings 104 and 105 are supported in the bracket member 115 which has the ring members 116 and 117 formed integral therewith. This bracket member is pivoted at 118 in a second bracket member 119. This pivoted joint, as shown in Figs. 1 and 2, is capable of only a very slight movement and serves to permit a slight vertical movement of the roller 100 in engaging the film upon the drum 50. The drum 100 is maintained in a firm but yielding engagement with the drum 50 by means of the spring 120 and the ball 120' shown in Fig. 1, in which figure they urge the bracket 115 toward the right.

The bracket 119 is mounted upon the pin 121 which is a "press" fit in the center plate of the soundhead due to the shaping of the end 122 to fit an appropriately diametered hole in the center plate, in order that the pin 121 may be maintained accurately perpendicular to the said center plate without the in accuracies ordinarily resulting from the tapping of a hole, or the threading of the end of the pin to fit into the tapped hole. The collar 123 fits snugly against the center plate, and against this collar bears the spring 124 which fits, as shown, into a recess in the member 119 and thrusts the member 119 toward the outer end of the pin and against the member 125. The member 125 is threaded upon the outer end of the pin 121 so that it may be adjusted longitudinally thereon, is split and provided with a lock-screw 126 as shown. Lateral adjustment of the side guides 107 and 110 relative to the roller 50 is accomplished by loosening the screw 126 and rotating the member 125 until the guides 107 and 110 are in the proper positions when the member 125 is again locked by tightening the screw 126.

It is, of course, necessary to lock the pressure roller in operative position against the roller 50, and to remove it from that position. Locking is accomplished by means of the bolt 127 which is retainer by an appropriate aperture in the center plate, or by an adjustable plate secured thereupon. The bolt 127 is urged toward the center plate by the spring 128 and may be pulled outwardly by the knob 129. A thumb piece 130 is also provided. To open the pressure roller the knob 129 is pulled outwardly, whereby the bolt 127 is removed from its aperture, and the pressure roller is permitted to drop back, while to close it into operating position the assembly is merely rotated by pressure of the member 130 until the bolt 127 snaps into the appropriate aperture, when the entire unit is locked in operating position. In operating position the roller is raised slightly against the pressure of the spring 120', which then maintains it in contact with the film upon the film drum.

Having now described our invention, we claim:

1. Pressure means for maintaining a film in cooperative relation with an opposing surface comprising a shaft mounted upon anti-friction bearings, a side guide member mounted rigidly upon the said shaft, a sleeve slidable upon the said shaft and carrying a pressure roller and a second side guide, and elastic means urging the said sleeve toward the said fixed side guide.

2. A bracket for supporting a pressure roller comprising a pivoted member, a second member pivoted to said pivoted member for limited movement and biased in one direction, and an arm for supporting the pressure roller extending substantially perpendicularly from said second member in the direction toward which it is biased.

3. A bracket for supporting a pressure roller comprising a pivoted member, a second member pivoted to said pivoted member for limited movement and urged in one direction by a spring, a pressure roller supported upon said second member, and means for manually moving the first of said pivoted members.

4. In combination with film guiding means, a pivot about which the said guiding means is rotatable, an adjustable nut threaded upon the outer end of said pivot, and a spring upon the inner end of said pivot urging said film guiding means toward the said adjustable nut, whereby the position of the said guiding means laterally of the film path can be adjusted.

FRED J. LOOMIS.
ELLWOOD W. REYNOLDS.